No. 616,525. Patented Dec. 27, 1898.
W. R. COON.
REIN HOLDER.
(Application filed Aug. 25, 1897.)
(No Model.)

Witnesses
W. J. LaBarre.
Chas. E. Brock.

Inventor
William R. Coon.
by O'Meara &c.
Attorneys

UNITED STATES PATENT OFFICE.

WILLIAM R. COON, OF ANGELICA, NEW YORK.

REIN-HOLDER.

SPECIFICATION forming part of Letters Patent No. 616,525, dated December 27, 1898.

Application filed August 25, 1897. Serial No. 649,497. (No model.)

*To all whom it may concern:*

Be it known that I, WILLIAM R. COON, a citizen of the United States of America, residing at Angelica, in the county of Allegany and State of New York, have invented a new and useful Rein-Holder, of which the following is a specification.

My invention relates to improvements in rein-holders for vehicles; and the object thereof is to produce a simple and effective holder having spring-clasps for receiving and holding the reins when not in use and provided with clasps for attaching it to the dashboard or other part of the vehicle.

In order to enable others skilled in the art to which my invention most nearly appertains to make and use the same, I will now proceed to describe its construction and operation, reference being had to the accompanying drawings, in which—

Figure 1:
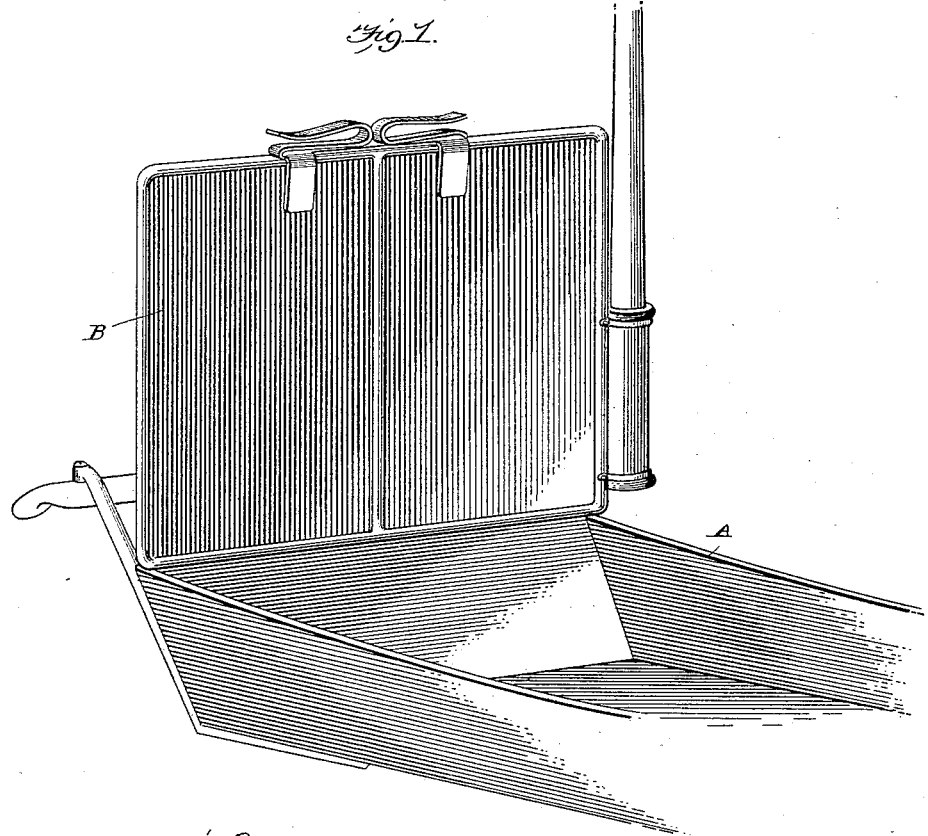
Figure 2:
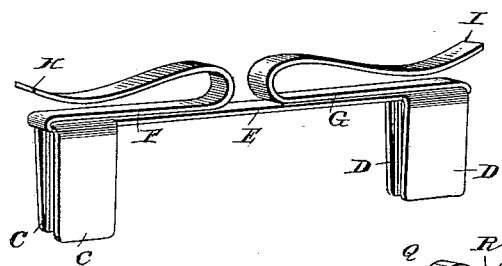
Figure 3:
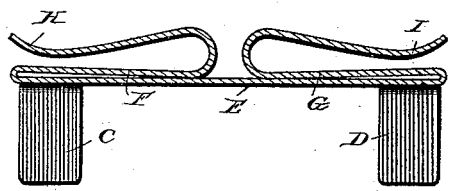
Figure 4:
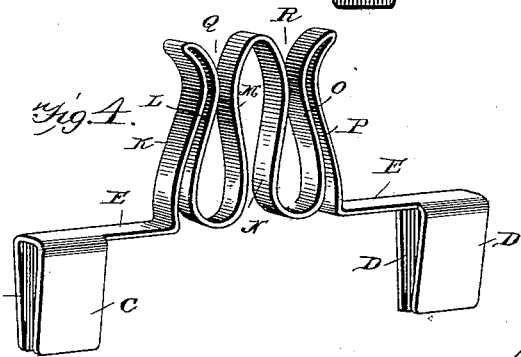

Figure 1 is a perspective view of the forward portion of a vehicle, illustrating my invention in place upon the dashboard. Fig. 2 is a perspective view of my improved rein-holder detached from the vehicle. Fig. 3 is a vertical longitudinal sectional view of the same. Fig. 4 is a view similar to Fig. 2, showing a slightly-modified form of the clasp.

Like letters of reference mark the same parts wherever they occur in the various figures of the drawings.

Referring to the drawings by letters, A is the body, and B the dashboard, of a buggy or other vehicle.

C C and D D are spring-jaws located substantially parallel to each other and projecting downwardly from a strip E of spring metal, with which they are preferably formed integral. In Figs. 2 and 3 the strip E directly connects the jaws C C and D D and extends beyond said jaws, being bent back upon itself at each end, as at F and G, and then again outward, as at H and I, forming spring-clamps, between which the reins may be inserted and held when not in use in the hands of the driver. The form of clasp just described is also illustrated in Fig. 1 in position upon the dashboard B, the jaws C C and D D serving to clamp the whole device to the dashboard, the strip E lying upon the top of the dashboard and the spring-clasps, formed of the bent arms F H and G I, resting upon the top of the strip E. When in this position, the driver may slip one rein into the space between the arms F and H and the other into the space between the arms G and I, where they will be held by the elasticity of these arms and prevented from dropping down between the horse and the vehicle, to be trampled upon by the horse or perhaps to frighten the animal and cause him to run away. A separate receptacle being formed for each rein, they will always be in proper position to be quickly grasped by the driver, obviating all tendency to crossing of the reins when they are necessarily quickly grasped, and therefore preventing the numerous accidents caused by such a condition.

In the modified form illustrated in Fig. 4 the strip E is of a sufficient length between the jaws C C and D D to permit of the formation of the spring-clasp for the reins, as shown. In this instance the strip is first bent upwardly at K, thence downwardly at L, again upwardly at M, again downwardly at N, again upwardly at O, and thence downwardly at P, forming two spaces Q and R, the different parts being so arranged that the arms L and M and N and O are normally held toward each other by spring-pressure, whereby when the reins are slipped into the spaces Q and R they will, as in the construction hereinbefore described, be securely held separate from each other and ready to be quickly grasped by the driver whenever necessary.

The clamps C C and D D may be so modified in construction as to adapt them to be used upon any portion of a vehicle to be drawn by a horse, and the construction of the device is such that it can be very cheaply made and quickly and easily adjusted in position for use.

My improved rein-holder may be made by hand out of a single piece of spring metal, or it may be made by proper machinery adapted to the purpose when desired in quantities.

While I have illustrated and described what I believe to be the best means for carrying out my invention, I do not wish to be understood as limiting myself to the exact construction and arrangement shown and described, but hold that such slight changes and variations as might suggest themselves to the ordinary mechanic would properly fall within the limit and scope of my invention.

Having thus fully described my invention, what I claim as new, and desire to secure by Letters Patent, is—

1. In a rein-holder, the combination of a strip having clamping-jaws formed on one side thereof, and on its opposite side having spring-clasps for receiving and holding the reins, substantially as set forth.

2. The herein-described rein-holder, consisting of the jaws C, C, and D, D, and the strip E connecting them and bent to form the portions, K, L, N, O, P, substantially as described.

WM. R. COON.

Witnesses:
C. D. McAHON,
JOSEPH C. CLARK.